(12) United States Patent
An et al.

(10) Patent No.: US 9,644,641 B2
(45) Date of Patent: *May 9, 2017

(54) ELECTRIC SUPERCHARGING DEVICE AND MULTI-STAGE SUPERCHARGING SYSTEM

(71) Applicant: MITSUBISHI HEAVY INDUSTRIES, LTD., Tokyo (JP)

(72) Inventors: Byeongil An, Tokyo (JP); Motoki Ebisu, Tokyo (JP); Hiroshi Suzuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,821

(22) Filed: Dec. 16, 2015

(65) Prior Publication Data

US 2016/0102677 A1 Apr. 14, 2016

Related U.S. Application Data

(63) Continuation of application No. 14/122,141, filed as application No. PCT/JP2012/067149 on Jul. 5, 2012, now Pat. No. 9,273,598.

(30) Foreign Application Priority Data

Jul. 15, 2011 (JP) .................................. 2011-156521

(51) Int. Cl.
*F02B 33/44* (2006.01)
*F04B 39/02* (2006.01)
(Continued)

(52) U.S. Cl.
CPC .......... *F04D 29/5806* (2013.01); *F02B 37/04* (2013.01); *F02B 37/16* (2013.01);
(Continued)

(58) Field of Classification Search
CPC ...... F04D 29/5806; F02B 37/04; F02B 39/14; F02B 39/005; F02B 39/16; Y02T 10/144
(Continued)

(56) References Cited

U.S. PATENT DOCUMENTS 4,689,960 A * 9/1987 Schroder ................. F02B 37/10
60/607
6,102,672 A 8/2000 Woollenweber et al.
(Continued)

FOREIGN PATENT DOCUMENTS

DE 2001-211608 A 8/2001
EP 1348848 A2 10/2003
(Continued)

OTHER PUBLICATIONS

Chinese Notice of Allowance dated Jan. 22, 2016, for Chinese Application No. 201280028585.7 with the English translation.
(Continued)

*Primary Examiner* — Nicholas J Weiss
*Assistant Examiner* — Ngoc T Nguyen
(74) *Attorney, Agent, or Firm* — Birch, Stewart, Kolasch & Birch, LLP

(57) ABSTRACT

It is intended to provide: an electric supercharging apparatus wherein, with a simple structure, rotor windage loss in an electric motor for driving a compressor is reduced and good cooling performance is produced; and a multi-stage supercharging system using the electric supercharging device. This electric supercharging apparatus is provided with: a first cooling passage formed in a stator along a motor coil and communicating a gas supply port with a gas discharge port in a motor housing; and a first intake passage connecting the gas discharge port to an intake port of a compressor. This electric supercharging apparatus is configured to introduce outside air into the first cooling passage via the gas
(Continued)

supply port by applying negative pressure to the first cooling passage via the first intake passage, thereby cooling the inside of the motor housing.

6 Claims, 3 Drawing Sheets

(51) Int. Cl.
| | |
|---|---|
| *F04D 29/58* | (2006.01) |
| *F02B 39/10* | (2006.01) |
| *F02B 39/16* | (2006.01) |
| *F02B 39/00* | (2006.01) |
| *F02B 37/04* | (2006.01) |
| *F02B 37/16* | (2006.01) |
| *F02B 37/18* | (2006.01) |
| *F04D 17/10* | (2006.01) |
| *F04D 29/42* | (2006.01) |
| *F02B 33/40* | (2006.01) |

(52) U.S. Cl.
CPC ............ *F02B 37/18* (2013.01); *F02B 39/005* (2013.01); *F02B 39/10* (2013.01); *F02B 39/16* (2013.01); *F04D 17/10* (2013.01); *F04D 29/4206* (2013.01); *F02B 33/40* (2013.01); *Y02T 10/144* (2013.01)

(58) Field of Classification Search
USPC .................................. 60/605.3; 417/46, 407
See application file for complete search history.

(56) References Cited

U.S. PATENT DOCUMENTS

| | | | |
|---|---|---|---|
| 6,609,375 B2 | 8/2003 | Allen et al. | |
| 6,668,553 B1 | 12/2003 | Ghizawi | |
| 7,056,103 B2 | 6/2006 | LaRue | |
| 7,246,490 B2 | 7/2007 | Sumser et al. | |
| 2010/0247343 A1* | 9/2010 | Shimizu | ................. F02B 37/10 417/410.1 |

FOREIGN PATENT DOCUMENTS

| | | |
|---|---|---|
| EP | 10113308 A1 | 10/2003 |
| JP | 9-19100 A | 1/1997 |
| JP | 2002-21794 A | 1/2002 |
| JP | 2002-339757 A | 11/2002 |
| JP | 2004-135447 A | 4/2004 |
| JP | 2004-332715 A | 11/2004 |
| JP | 2005-127307 A | 5/2005 |
| JP | 2005-127319 A | 5/2005 |
| JP | 2006-257994 A | 9/2006 |
| JP | 2006-307648 A | 11/2006 |
| JP | 2008-19835 A | 1/2008 |
| JP | 2008-215075 A | 9/2008 |
| JP | 2009-41556 A | 2/2009 |
| JP | 2012-62777 A | 3/2012 |
| WO | WO 02/50408 A1 | 6/2002 |
| WO | WO 2005/113961 A1 | 12/2005 |
| WO | WO 2009/087274 A2 | 7/2009 |

OTHER PUBLICATIONS

Chinese Office Action issued May 26, 2015 in corresponding Chinese Paten Application No. 201280028585.7 (with an English-language translation).
International Preliminary Report on Patentability of PCT/JP2012/067149 mailed Jan. 30, 2014 with an English Translation.
International Search Report of PCT/JP2012/067149 dated Jul. 5, 2012.
Notice of Allowance for related application JP 2011-156521 dated Nov. 6, 2013 with an English Translation.
European Search Report, mailed Oct. 19, 2015, in European Patent Application No. 12815302.0 (with an English translation).

* cited by examiner

ELECTRIC SUPERCHARGING DEVICE AND MULTI-STAGE SUPERCHARGING SYSTEM

This application is a Continuation of application Ser. No. 14/122,141, filed on Dec. 16, 2013, which was filed as PCT International Application No. PCT/JP2012/067149 on Jul. 5, 2012, which claims priority under 35 USC §119(a) of Japanese Application No. 2011-156521, filed in Japan on Jul. 15, 2011, all of which are hereby expressly incorporated by reference into the present application.

TECHNICAL FIELD

The present invention relates to the technical field of an electric supercharging device for supercharge of an internal combustion engine such as an engine by being driven by an electric motor for, and of a multi-stage supercharging using the electric supercharging device.

BACKGROUND ART

In an internal combustion engine such as an engine, there is a case where the intake air is compressed and supplied using a supercharging apparatus such as a turbocharger, thereby increasing output. As one type of this supercharging apparatus, there is a turbocharger which is configured to rotate a turbine at high speed using energy of the exhaust gas and drive a centrifugal compressor by the rotational force so as to feed the compressed air into the engine. However, the supercharging pressure is decreased when the engine speed is low in the turbocharger. And sufficient increase of the output cannot be expected. On the other hand, the electric supercharging apparatus which his drive by an electric motor has the advantage that a predetermined supercharging pressure can be obtained even at low engine rotation speed.

Since a rotor of the electric motor is generally provided with convex-shaped pole on its surface, as the motor rotation speed increases, a substantial amount of windage loss occurs due to the irregular surface shape. This can cause not only the power loss of the electric motor but wind noise caused by the rotor, which can lead to the noise increase. In order to reduce this power loss and noise, design change of the rotor may be considered, but there is a limit to this in reality. To solve this issue, it is taught, for instance in Patent Document 1, to seal the periphery of the rotor of the electric motor in a reduced pressure state so as to reduce air resistance of the rotor and also achieve improved power efficiency and reduced noise.

When the motor speed rises, calorific value increases in the motor coil where the current flows, an inverter part for the motor control, or the like. Especially when the electric motor is accelerated or when a large load is applied, a large current flows and the calorific value increases. Thus, a cooling mechanism is required. There are many types of cooling mechanisms such as air-cooled or water-cooled cooling mechanism. For instance, disclosed in Patent Document 2 is an air-cooling mechanism in which, by utilizing the differential pressure between the atmospheric pressure and the compressor outlet pressure pressurized by the electric motor, a portion of the compressed air is sprayed to the vicinity of the rotor.

CITATION LIST

Patent Document

[Patent Document 1] JP 9-19100 A
[Patent Document 2] JP 2006-257994 A

SUMMARY

Technical Problem

As described above, reduction in windage loss of the rotor and improved cooling performance of the internal heat generation are desired in the electric motor. However, there is a problem when trying to provide the decompression means or the cooling mechanism as described in Patent Document 1 and Patent Document 2 in order to satisfy these requirements. Specifically, the configuration of the electric motor is undesirably complicated. Further, the compressed air used for cooling in Patent Document 2 is high-pressure and high-temperature, there is a problem that the cooling efficiency is low and a sufficient cooling performance cannot be expected.

The present invention has been made in view of the above problems, and an object of the present invention is to provide an electric supercharging apparatus and a multi-stage supercharging system using the electric supercharging apparatus, which can achieve reduction of the windage loss of the rotor and improved cooling performance in the electric motor which drives the compressor.

Solution to Problem

To solve the above issues, an electric supercharging apparatus according to the present invention is configured to rotate an electric motor that comprises a rotor shaft rotatably supported in a motor housing to which a motor coil and a stator are fixed, so as to drive and supercharge a compressor connected to one end of the rotor shaft, and the electric supercharging apparatus according to the present invention comprises: a gas supply port and a gas discharge port which are provided in the motor housing; a first cooling passage which communicates the gas supply port and the gas discharge port in the motor housing and which is formed in the stator along the motor coil; and a first intake passage which connects the gas discharge port to an inlet port of the compressor. Further, outside air is introduced to the first cooling passage from the gas supply port using a negative pressure of the inlet port of the compressor applied to the first cooling passage via the first intake passage.

According to the present invention, the outside air is introduced to the first cooling passage from the gas supply port by applying the negative pressure of the inlet port of the compressor to the first cooling passage via the first intake passage, so as to cool the vicinity of the first cooling passage where heating is likely to occur (such as a stator and a motor coil). According to the present invention, as described above, the outside air is introduced using the negative pressure of the compressor without an energy-consuming configuration such as a pump. Therefore, it is possible to effectively cool the interior of the motor housing which generates a large amount of heat, with a simple configuration. In particular, the air introduced into the first cooling passage is not supercharged air of high temperature but is the outside air. Thus, it is possible to obtain an excellent cooling effect.

Preferably, a second cooling passage is also provide, which connects the gas supply port to the gas discharge port in the motor housing and which is formed along the rotor shaft between the rotor shaft and its peripheral member, and the second cooling passage joins the first cooling passage in the motor housing so that the outside air is introduced to the second cooling passage from the gas supply port by a negative pressure applied via the first intake passage. Generally, there is at least a small gap formed around the rotor shaft to prevent contact (or collision) with the peripheral member when the rotor shaft is rotated. The second cooling passage is configured to also serve as the gap, and by applying a negative pressure thereto, the outside air is introduced from the gas supply port to cool the vicinity of the rotor shaft to which the heat is easily transferred from the motor coil and the stator with high heat value. Further, the second cooling passage is reduced in pressure by the negative pressure applied thereto and thus, it is possible to reduce air resistance of the rotor shaft and the windage simultaneously. Furthermore, the first cooling passage and the second cooling passages are configured to join together in the motor housing and thus, the outside air can be introduced to the second cooling passage by a negative pressure applied via a single first intake passage. This is advantageous in that a significant cooling effect can be obtained with a simple structure.

The above electric supercharging apparatus may further comprise an inverter unit which comprises an element circuit board housed in an inverter housing, the inverter unit being mounted on a side of the motor housing where the gas supply port is formed, and an air hole to let the outside air through to the gas supply port may be provided on the element circuit board. Generally, the inverter unit for control of the electric motor is another component that generates heat easily. In this aspect of the present invention, by providing an air hole on the element circuit board belonging to the inverter unit, it is possible to let the outside air through to the gas supply port of the motor housing so as to cool. Further, by installing the inverter unit in the motor housing, the distance between the electric motor and the inverter can be shorter and the electric power loss therebetween can be minimized.

The above electric supercharging apparatus may further comprise: a first control valve for adjusting an opening of the first intake passage; and a controller for controlling an opening degree of the first control valve. According to this aspect, by adjusting the opening degree of the first control valve, it is possible to change the value of the negative pressure applied to the first cooling passage and to control the amount of the outside air being introduced. As a result, it is possible to adequately regulate the cooling level.

In this case, the electric supercharging apparatus may further comprise: a negative-pressure supply part which is connected to the gas supply port via the second intake passage to apply a negative pressure to the first cooling passage; and a second control valve for adjusting an opening of the second intake passage, and the controller may be configured to control the opening degree of the first control valve and an opening degree of the second control valve. According to this aspect of the present invention, if sufficient negative pressure for cooling cannot be obtained via the first intake passage, the opening degree of the second control valve is adjusted to supplementarily supply the negative pressure from the negative-pressure supply part. As a result, the cooling performance can be improved.

Moreover, a plurality of the first cooling passages may be provided to surround the motor coil in a section orthogonal to the rotor shaft. The motor coil is a component having a large heat value. Thus, in this aspect, the first cooling passages are provided surrounding the motor coil so as to suppress the temperature rise of the motor coil and also to obtain an excellent cooling performance.

Further, the first cooling passage may be configured in part to include an outer wall surface of the motor coil. According to this aspect, the outside air flowing in the first cooling passage contacts the wall surface of the motor coil directly, thereby drawing heat from the motor coil. As a result, it is possible to achieve an excellent cooling performance.

To solve the above issues, a multi-stage supercharging system according to the present invention comprises: the electric supercharging apparatus as described above; and a pre-stage supercharger which is arranged on an upstream side with respect to the electric supercharging apparatus and which is configured to supercharge gas in a pre-stage and supply to the electric supercharging apparatus. In this multi-stage supercharging system, the compressed gas having been supercharged by a pre-stage supercharger, such as a turbocharger, arranged on the upstream side (the low pressure side) is supplied to the above electric supercharging apparatus so as to perform supercharging in multiple stages and increase the supercharging pressure. As a result, the high supercharging pressure can be obtained and thus, it is possible to realize the system capable of performing even when the required output is large, such as during acceleration.

Preferably, the first intake passage is connected to an inlet port which is provided on an intake side of the pre-stage supercharger. According to this aspect, by connecting the first intake passage to the inlet port of the pre-stage supercharger which has high negative pressure at the inlet port compared to the electric supercharging apparatus disposed on the downstream side, it is possible to apply a large negative pressure to the above cooling passage formed in the motor housing, thereby achieving a good cooling performance. Further, a significant pressure reduction effect in the cooling passage can be obtained. As a result, air resistance around the rotor shaft is reduced, thereby contributing to reduction of the windage loss.

Advantageous Effects

According to the present invention, the outside air is introduced to the first cooling passage from the gas supply port by applying the negative pressure of the inlet port of the compressor to the first cooling passage via the first intake passage, so as to cool the vicinity of the first cooling passage where heating is likely to occur (such as a stator and a motor coil). According to the present invention, as described above, the outside air is introduced using the negative pressure of the compressor without an energy-consuming configuration such as a pump. Therefore, it is possible to effectively cool the interior of the motor housing which generates a large amount of heat, with a simple configuration. In particular, the air introduced into the first cooling passage is not supercharged air of high temperature but is the outside air. Thus, it is possible to obtain an excellent cooling effect.

DETAILED DESCRIPTION

The present invention will now be described in detail using embodiments shown in the accompanying drawings. It is intended, however, that unless particularly specified in these embodiments, dimensions, materials, and shapes of components, their relative positions and the like shall be interpreted as illustrative only and not limitative of the scope of the present invention.

First Embodiment

Figure 1:
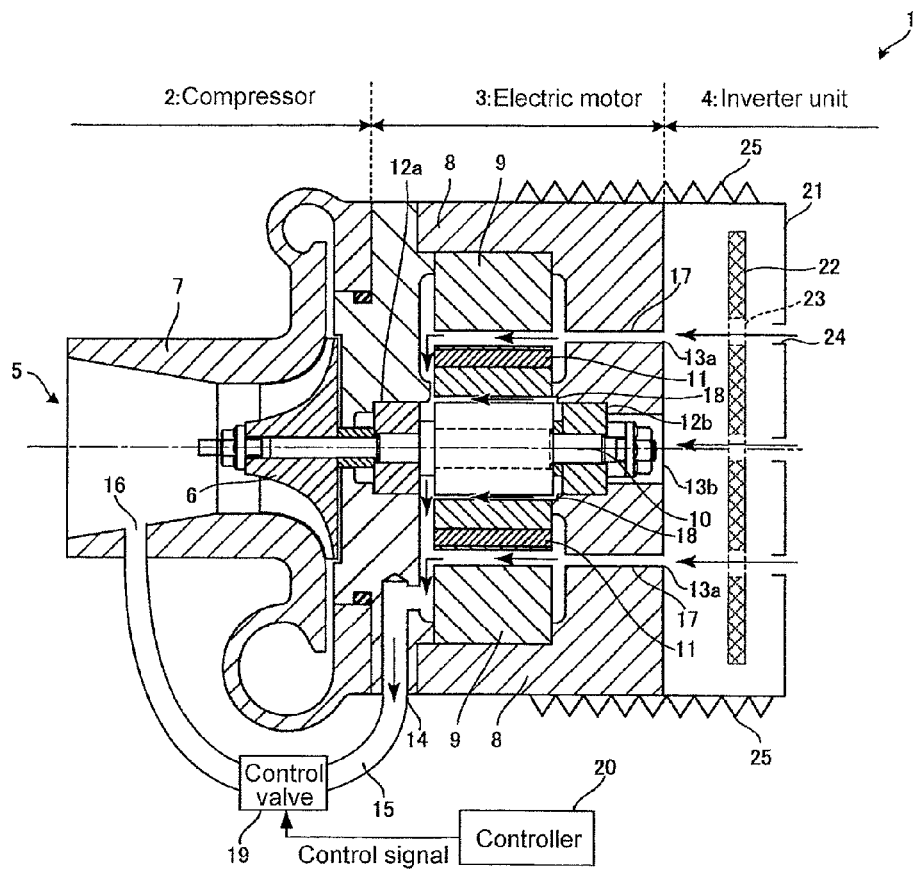
FIG. 1 is a cross-sectional view of an overall configuration of an electric supercharging apparatus according to a first embodiment.

FIG. 1 is a cross-sectional view of an overall configuration of an electric supercharging apparatus 1 according to a first embodiment. The electric supercharging apparatus 1 is provided with a compressor 2 for supercharging gas, an electric motor 3 for driving the compressor 2 and an inverter unit 4 functioning as an inverter for control of the electric motor 3. The inverter unit 4 obtains DC current power from a battery (not shown) and changes the current and voltage applied to the electric motor 3 so as to control the rotation speed of the electric motor 3.

The inverter unit 4 and the electric motor 3 are integrally connected so as to reduce the distance between the inverter unit 4 and the electric motor 3, thereby minimizing electrical loss of the power supplied to the electric motor 3. In the case where the electrical loss is not an issue, the electric motor 3 and the inverter unit 4 may be arranged away from each other as separate units.

In the compressor 2, the gas drawn from the inlet port 5 is pressurized by a compressor wheel 6 which is rotated by the electric motor 3 and then discharged from a discharge port (not shown) through an interior of the compressor cover 7, so as to supercharge to an intake system of the internal combustion engine such as an engine. The compressor wheel 6 is accommodated in an inner central portion of the compressor cover 7. The compressor wheel 6 is connected to one end of a rotor shaft of the electric motor 3 to be rotationally driven.

The electric motor 3 is provided with a stator 9 (a stator) which is fixed to the interior of the motor housing 8 and a rotor shaft 10 (a rotator) which is rotatable around the rotor shaft 10. Inside the motor housing 8, the rotor shaft 10 is supported by rolling bearings 12a and 12b from both sides thereof to be rotatable around the rotation shaft.

Particularly in this embodiment, used as the rolling bearings 12a and 12b are grease enclosed rolling bearings with seal which are provided with grease leakage prevention measures at high rotation speed. By using the grease enclosed rolling bearings with seals as described above, it is no longer necessary to supply lubricating oil from outside of the electric supercharging apparatus 1 (e.g. from the engine) as in the case of using rolling bearings of oil-lubricated type. Thus, it is possible to omit an introduction path for lubricating oil and also simply the internal structure of the electric motor 3.

In this embodiment, described is a two-end support type where both ends of the rotor shaft 10 of the electric motor 3 are respectively supported by the rolling bearings 12a and 12b. This is, however, not limitative and the present invention is also applicable to a one-end support type where only one end of the rotor shaft 10 is supported by a rolling bearing.

If the lubricating oil is used in the rolling bearing 12, the lubricating oil is supplied from the engine or the like and thus, it is necessary to arrange the electric supercharging apparatus 1 at a position near the engine, where it is subjected to high temperature and frequent vibration. However, by using the grease enclosed rolling bearing described in this embodiment, supply of the lubricating oil is no longer necessary and thus, the installation location of the electric supercharging apparatus 1 is not subject to the above limitation. Therefore, the electric supercharging apparatus 1 can be mounted to a vehicle body or the like with little vibration and good ventilation which is far from the engine and suitable for cooling. This improves the degree of freedom of installation layout.

Further, the electric power energy supplied from the inverter unit 4 is mainly used to drive the electric motor 3 and is at least in part converted into heat energy as heating. In particular, heat generation is likely to occur in a motor coil 11 under high loads and acceleration of the electric motor 3 and thus, cooling thereof is important. In the present embodiment, cooling passages are formed in the motor housing 8, and cooling is performed by the outside air introduced to the cooling passages as described below.

In the motor housing 8, a gas supply port 13 and a gas outlet 14 are formed to introduce and discharge the outside air into and from the cooling passage. The gas supply port 13 is provided on the side of the motor housing 8 facing the inverter unit 4, and a plurality of the supply ports is formed corresponding to the inlets of the first cooling passage and the second cooling passage which are described later (in FIG. 1, the gas supply port corresponding to the inlet of the first cooling passage is "13a" and the gas supply port corresponding to the inlet of the second cooling passage is "13b"). The gas discharge port 14 is provided on the side surface of the motor housing 8, which is on the compressor 2 side.

An intake passage 15 is an example of the "first intake passage" according to the present invention. The intake passage 15 is provided so as to connect the gas discharge port 14 and the negative-pressure outlet port 16 which is formed by opening a hole on the side of the compressor cover 7. The intake passage 15 is, for example, made of a tubular member such as a rubber hose, but the material is not particularly limited. On the side wall of the compressor cover 7, the negative-pressure outlet port 16 is formed so as to communicate with the interior of the compressor cover 7, and the negative pressure generated inside the compressor cover 7 is drawn out from one end of the intake passage 15 by rotation of the compressor wheel 6. The other end of the intake passage 15 is connected to the gas discharge port 14 provided in the motor housing 8 and is configured so that the negative pressure is applied to the cooling passage formed inside the motor housing 8 from the gas discharge port 14.

The gas supply port 13 communicates with the gas discharge port 14 inside the motor housing 8 via the first cooling passage 17, and the first cooling passage 17 is formed along the motor coil 11 in the stator 9. This first cooling passage 17 communicates with the intake passage 15 via the gas discharge port 14. As the negative pressure transmitted from the negative-pressure outlet port 16 is applied to the first cooling passage 17, the outside air is drawn into the first cooling passage 17 from the gas supply port 13. The outside air introduced into the first cooling passage 17 flows through the motor housing 8 as indicated by arrows in FIG. 1 and then introduced to the inlet port 5 of the compressor 5 from the negative pressure outlet port 16 via the intake passage 15.

The first cooling passage 17 is formed as described above to extend along the motor coil 11 which generates a large amount of heat, and thus by allowing the flow of the outside air therein, good cooling performance can be obtained. In particular, the outside air is introduced by the negative pressure of the compressor 2 without an energy-consuming structure such as a pump and thus, it is possible to effectively cool the interior of the motor housing 8 which generates a large amount of heat, with a simple configuration in the present invention. The air introduced into the first cooling passage 17 is not supercharged air of high temperature but is the outside air. Thus, it is possible to obtain an excellent cooling effect.

Figure 2A:
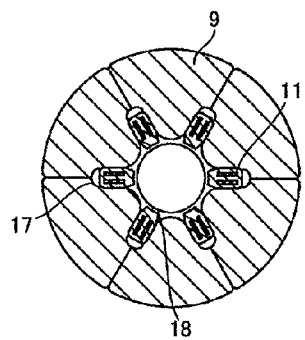
FIG. 2A illustrates one configuration of a first cooling passage in an electric motor.
Figure 2B:
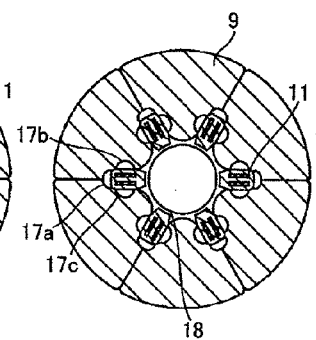
FIG. 2B illustrates another configuration of the first cooling passage in the electric motor.
Figure 2C:
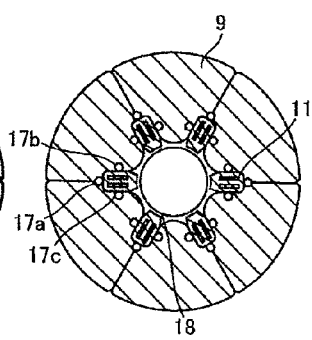
FIG. 2C illustrates yet another configuration of the first cooling passage in the electric motor.

Referring to FIG. 2A, FIG. 2B and FIG. 2C, configuration examples of the first cooling passages 17 in the electric motor 3 are described. FIG. 2A, FIG. 2B and FIG. 2C are cross-sectional views illustrating configuration examples of the first cooling passage 17 inside the electric motor 3. The most simple example is illustrated in FIG. 2A where the first cooling chamber 17 is provided for each of the motor coils 11. Particularly, in FIG. 2A, the first cooling passage 17 is provided between the stators 9 so that an outer wall surface of the motor coil 11 constitutes a part of the cooling passage 17. As a result, the surface of the motor coil 11 is directly cooled by the outside air flowing in the first cooling passage 17. Thus, it is possible to obtain an excellent cooling effect.

Further, as illustrated in FIG. 2B and FIG. 2C, a plurality of the first cooling passages 17 may be provided for each of the motor coils 11. By providing more first cooling passages 17 in this fashion, it enhances the cooling performance and it is possible to deal with a larger heat generation. Furthermore, in the case of providing a plurality of the first cooling passages 17 in this fashion, the first cooling passages 17 may be arranged to surround the motor coil 11 in a section orthogonal to the rotor shaft 10. Particularly, by arranging the first cooling passages 17 so that a portion of each of the first cooling passages 17 includes the outer wall of the motor coil 11 as illustrated in FIG. 2C, the outside air directly contacts a larger area of the surface of the motor coil 11, thereby achieving improved cooling effect.

The shape, number and area of the first cooling passage 17 illustrated in FIG. 1, FIG. 2A, FIG. 2B and FIG. 2C may be appropriately changed depending on heat value (thermal load) of the motor coil 11 which is a heat generating source. As specific examples of the cross-sectional shape of the first cooling passages 17, crescent, circular and elliptical shape may be considered.

Returning to FIG. 1, similarly to the first cooling passage 17, a second cooling passage 18 is formed in the motor housing 8 so as to communicate with the gas supply port 13 and the gas exhaust port 14. In particular, in communication with the gas exhaust port 14 and the gas supply port 13 in the motor housing 8, the second cooling passage 18 is formed along the rotor shaft 10 between the rotor shaft 10 and a peripheral member of the rotor shaft 10.

Generally, there is at least a small gap formed around the rotor shaft 10 to prevent contact (or collision) with the peripheral member when the rotor shaft 10 is rotated. The second cooling passage 18 is configured to also serve as the gap, and by applying a negative pressure to the second cooling passage 18, the outside air is introduced from the gas supply port 13 into the second cooling passage 18, thereby cooling the vicinity of the rotor shaft 10 to which the heat is easily transferred from the motor coil 11 and the stator 9 with high heat value. Further, the second cooling passage 18 is reduced in pressure by the negative pressure applied thereto and thus, it is possible to reduce air resistance of the rotor shaft 10, thereby also reducing the windage loss simultaneously.

The second cooling passage 18 joins the first cooling passage 17 inside the motor housing 8, and the negative pressure is applied to the second cooling passage 18 as well as the first cooling passage 17 from the intake passage 15, thereby introducing the outside air from the gas supply port 13. By configuring the first cooling passage 17 and the second cooling passage 18 so as to join together in the motor housing 8, it is possible to introduce the outside air into these two cooling passages 17 and 18 by applying the negative pressure by means of a single intake passage 15. As a result, it is possible to obtain a large cooling effect with a simple structure.

Further, the second cooling passage 18 is formed so as to run through the periphery of the rolling bearing 12 supporting the rotor shaft 10. Furthermore, the second cooling passage 18 is configured to cool the rolling bearing 12 in addition to the rotor shaft 10. The interior of the electric motor 3 is basically made of a metal material having good thermal conductivity and thus, the heat is easily transferred to the rolling bearing 12 from the motor coil 11 side and the temperature rises easily. In the present embodiment, by providing the second cooling passage 18 passing through the rolling bearing 12 as well as the rotor shaft 10, it is possible to realize efficient cooling of these parts with simple configuration.

In the intake passage 15, a control valve 19 for adjusting the opening of the intake passage 15 is provided. The control valve 19 is an example of a "first control valve" according to the present invention, and by adjusting the opening degree of the control valve 19, the flow rate of the gas through the intake passage 15 is regulate, and the value of the negative pressure transmitted to the first cooling passage 17 and the second cooling passage 18 is controlled. As a result, the flow rates of the gas in the first cooling passage 17 and the second cooling passage 18 are adjusted to perform the cooling according to the heat value of the motor coil 11.

The opening degree of the control valve 19 is adjusted based on a control signal from a controller 20. The controller 20 is an example of the "controller" according to the present invention. For instance, the temperature of the motor coil 11 which is a cooling object is detected by a temperature sensor (not shown) attached to the motor coil 11 and the control signal is transmitted to the control valve 19 based on the detection value so as to adjust the opening degree of the control valve 19. In the present invention, cooling is performed by drawing in the outside air by applying the negative pressure to the first cooling passage 17 and the second cooling passage 18, and as the negative pressure is applied from the inlet port 5 of the compressor 2, the supercharging efficiency of the compressor 2 decreases to some extent. However, by adjusting the opening degree of the control 19 appropriately in accordance with the temperature of the motor coil 11 in the above manner, it is possible to avoid application of the negative pressure more than necessary. Therefore, it is possible to prevent decline of the supercharging efficiency of the compressor 2 and perform efficient cooling inside the electric motor 3. Typically, it is preferable to introduce the outside air by adjusting the control valve 19 so that the temperature of the motor coil 11 is in the range of 150 to 200° C.

In the above described case, the opening degree of the control valve 19 is controlled based on the detection value of the temperature sensor attached to the motor coil 11, but a control example is not limited to this. For example, if it is difficult to install the temperature sensor to the motor coil 11, the temperature sensor may be installed in other location and estimate the temperature of the motor coil 11. Alternatively, the temperature sensor may be installed in the inverter unit 4 which is another component that easily generates heat, or the opening degree of opening degree of the control valve 19 may be controlled based on parameters other than the temperature, such as the motor rotation speed.

The inverter unit 4 is attached to the side of the motor housing 8 where the gas supply port 13 is formed, and the element circuit board 22 is accommodated in the inverter housing 21. The element circuit board 22 is incorporated with elements constituting the inverter circuit and is vertically fixed to the inside of the inverter housing by a support (not shown). By providing a plurality of through holes in the element circuit board 22 and fixing the element circuit board 22 to the support, the outside air passes through the inverter unit 4 and then enters the first cooling passage 17 and the second cooling passage 18 smoothly from the gas supply port 13 provided in the motor housing 8.

Particularly, an air hole 23 is formed in the element circuit board 22 at a location corresponding to the gas supply port 13 provided in the motor housing 8. Further, an opening hole 24 is formed in the inverter housing 21 at a location corresponding to the air hole 23. As a result, it is configured so that the outside air can be introduced more smoothly to the first cooling passage 17 and the second cooling passage 18 from the outside of the inverter unit 4.

Cooling pins 25 are provided on the side wall surface of the inverter housing 21 and motor housing 8. The cooling pins 25 serve as radiating fins. By increasing the surface area of the side wall surface for contact with the outside air, heat dissipation is improved, thereby further enhancing the above cooling performance.

The suction force of the negative pressure for drawing in the outside air weakens if the above-described cross-sectional areas of the first cooling passage 17 and the second cooling passage 18 are set wide. Thus, the cross-sectional areas of the first cooling passage 17 and the second cooling passage 18 are arbitrarily set according to the cooling performance required by the electric motor 3, the value of the negative pressure at the inlet port 5, etc. More specifically, from the viewpoint of increasing the suction force for drawing in the outside air, it is preferable to set the cross-sectional areas of the first cooling passage 17 and the second cooling passage 18 as small as possible.

In the case where it is difficult to apply a sufficient negative pressure to the first cooling passage 17 and the second cooling passage 18 using a single gas discharge port 14, a plurality of the gas discharge ports 14 may be provided in the motor housing 8 and each of the gas discharge ports 14 may be connected to a separate suction passage.

As described above, according to the electric supercharger 1 of the present embodiment, by applying a negative pressure from the intake passage 15 to the cooling passages 17 and 18, it is possible to introduce the outside air from the gas supply port 13 and cool the peripheral part of the cooling passages 17 and 18 which easily produce heat. In the electric supercharger apparatus 1 according to this embodiment, the outside air is introduced using the negative pressure of the compressor 2 without the configuration that accompanies energy consumption, such as a pump. Thus, the interior of the motor housing 8 with a large calorific value can be effectively cooled with the simple structure. Particularly, as the outside air is introduced to the cooling passages 17 and 18, instead of supercharged air of high temperature, excellent cooling effect can be achieved. Especially, the second cooling passage 18 is reduced in pressure by the negative pressure applied thereto and hence, air resistance of the rotor shaft is reduced. As a result, it is possible to achieve reduction of windage loss at the same time.

Second Embodiment

Figure 3:
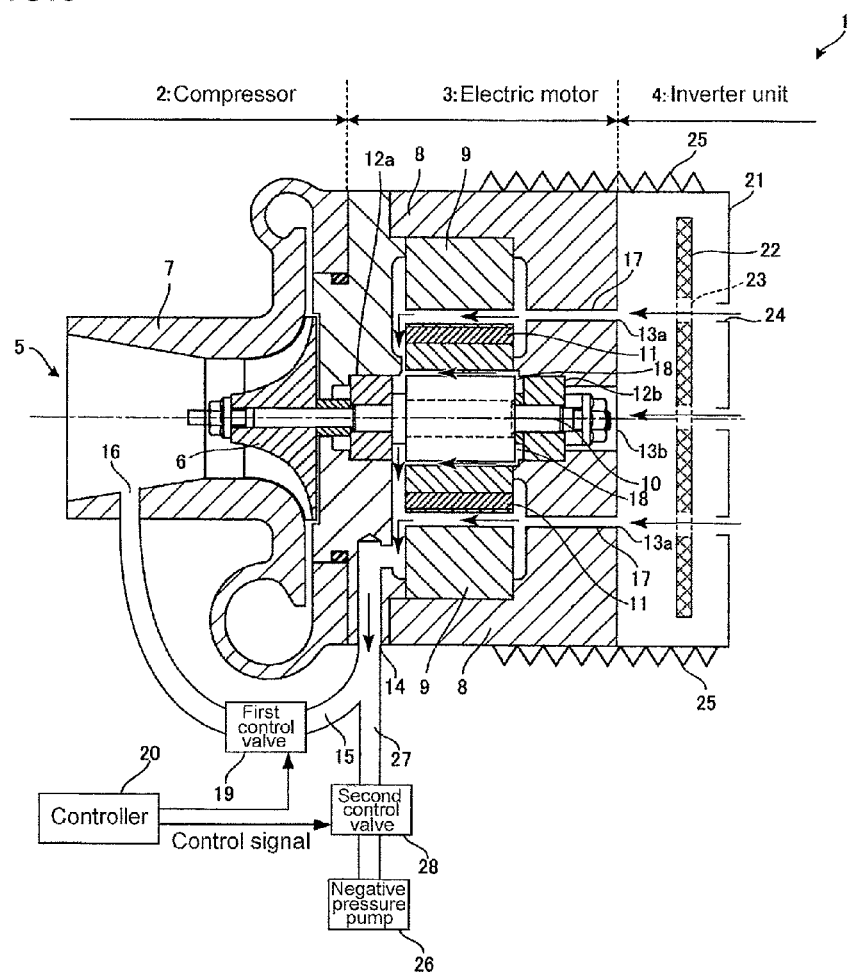
FIG. 3 is a cross-sectional view of the overall configuration of the electric supercharging apparatus according to a second embodiment.

FIG. 3 is a cross-sectional view of the overall configuration of the electric supercharging apparatus 1 according to a second embodiment. In the following embodiments, components already described in reference to the first embodiment are denoted by the same reference numerals, and thus detailed description thereof is appropriately omitted.

In the second embodiment, an auxiliary vacuum pump 26 not shown (hereinafter referred to as "negative pressure pump 26") for the engine (not shown) to which the electric supercharging apparatus 1 supercharges, the negative pressure is supplied to the gas exhaust port 14 and the outside air is introduced into the first cooling passage 17 and the second cooling passage 18 to perform the cooling. The negative pressure pump 26 is connected to the gas discharge port 14 via the second intake passage 27, and a second control valve 28 is for adjusting an opening degree is provided in the second intake passage 27. Together with the first control valve 19, the opening degree of the second control valve 28 is controlled by the controller 20 so as to adjust the negative pressure value transmitted to the first cooling passage 17 and the second cooling passage 18.

Herein, a control example of the second embodiment is described in details. First, it is assumed that the second control valve 28 is basically set to "closed" and that application of the negative pressure to the first cooling passage 17 and the second cooling passage 18 is performed using the first control valve 19. In such a case, the temperature inside the motor housing 8 rises depending on the operating state of the electric motor 3 and it is sometimes difficult to obtain the cooling performance required for cooling solely by the negative pressure from the negative pressure outlet port 16 (That is, it may not be possible to introduce enough outside air into the first cooling passage 17 and the second cooling passage 18 solely by the negative pressure from the negative pressure outlet port 16). In such a case, the controller 20 controls the second control valve 28 to open so as to make up shortage of the negative pressure from the negative pressure outlet port 16 with the negative pressure from the negative pressure pump 26.

In the present embodiment, by providing a plurality of negative pressure supply sources (the negative pressure outlet port 16 and the negative pressure pump 26), if enough outside air cannot be introduced by the negative pressure from one of the negative pressure supply sources, the negative pressure from the other can be supplied supplementarily so as to enhance the cooling performance. This type of control for the first control valve 29 and the second control valve 28 may be performed by detecting a temperature of the motor coil 11, the element circuit board 22 in the inverter unit 4, etc. using a temperature sensor such as a thermistor and a thermocouple and adjusting the opening degree of each of the first control valve 29 and the second control valve 28 based on the detection value.

Third Embodiment

Figure 4:
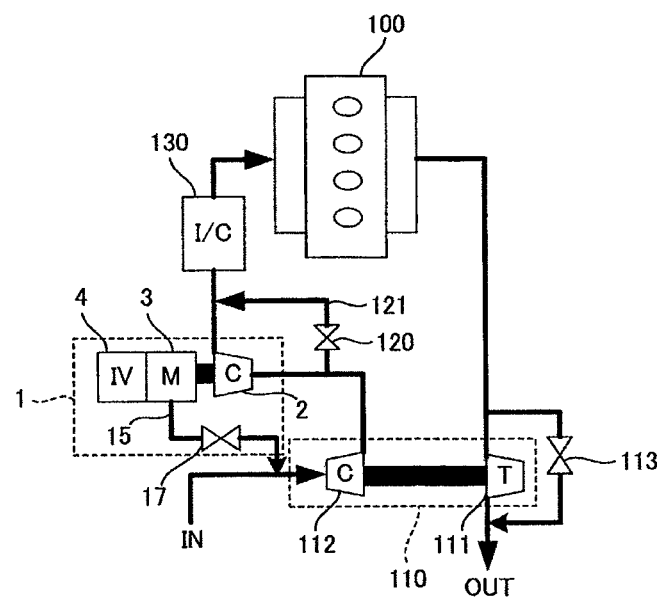
FIG. 4 is a block diagram of an overall configuration of an electric 2-stage supercharging system according to a third embodiment.

Next, in reference to FIG. 4, explained is the case where the electric supercharging apparatus 1 according to the present invention is applied to an electric e-stage supercharging system configured by combining the electric supercharging apparatus 1 according to the present invention with a turbocharger 110 which is driven by the exhaust gas from an engine 100. FIG. 4 is a block diagram of an overall configuration of the electric 2-stage supercharging system according to a third embodiment.

The electric 2-stage supercharging system according to the present embodiment comprises a turbocharger 110 on a low pressure side (a downstream side) as a supercharging unit for the engine 100. The turbocharger 110 has a compressor 112 which operates in conjunction with an exhaust turbine 111 driven by the exhaust gas from the engine 100. Further, the electric supercharging apparatus 1 which is powered by the electric motor described in the above embodiments is provided on a high pressure side (an upstream side). On the exhaust turbine 11 side of the turbocharger 110, a wastegate valve 113 is provided. On the intake side of the electric supercharging apparatus 1, a bypass passage 121 equipped with a bypass valve 120 is provided. Further, the compressed gas discharged from the electric supercharging apparatus 1 arranged on the high pressure side is cooled by an intercooler 130 and then supplied to the engine 100.

In this electric 2-stage supercharging system, the compressed gas is supercharged in the turbocharger and then further compressed in the electric supercharging apparatus 1. The compressed gas undergoes two stages of supercharging, and the supercharging pressure can be enhanced. As a result, compared to the case where only the turbocharger 110 is provided as a supercharging unit, it is possible to obtain high supercharging pressure and thus, it is possible to realize the system capable of performing even when the required output is large, such as during acceleration.

In this embodiment, the negative pressure outlet port 16 (see FIG. 1 and FIG. 3) to which the first intake passage 15 is connected in the electric supercharging apparatus 1 is provided on the intake side of the turbocharger 110. As a large negative pressure is generated on the intake side of the turbocharger 110 than on the exhaust side of the turbocharger 110, by providing the negative pressure outlet port 16 on the intake side of the turbocharger 110 as described above, a large negative pressure can be applied to the cooling passages 17 and 18 formed in the motor housing 8 of the electric supercharging apparatus 1 so as to obtain better cooling performance. At the same time, the effect of reducing the pressure in the cooling passages 17 and 18 may be obtained greatly and thus, the air resistance around the rotor shaft 10 is reduced, and this contributes to a reduction in windage loss.

In the case shown in FIG. 4, the turbocharger 110 utilizing the exhaust gas on the low pressure side is used. This is, however, not restrictive and a VG turbocharger, a VFT turbocharger, a 2-stage turbocharger, a mechanical supercharger and the like may be used.

Further, as described above, by using the grease-enclosed rolling bearing as the rolling bearing 12 for supporting the rotor shaft 10 of the electric motor 3 belonging to the electric supercharging apparatus 1, unlike the case of the rolling bearing using the lubricating oil, the engine 100 does not need to be supplied with lubricating oil. Therefore, the electric supercharging apparatus 1 does not need to be installed near the engine 100 in consideration of the supply of the lubricating oil and can be mounted on a place away from the engine, such as a vehicle body, with less vibration and breathability which is suitable for cooling. More preferably, by arranging the electric supercharging apparatus 1 near the power supply system such as a battery, wiring resistance is less which leads to improved performance. There is an advantage that the electric supercharging apparatus 1 according to the present invention has less restricted installation position within the vehicle body as described above and high flexibility of the layout.

INDUSTRIAL APPLICABILITY

The present invention is applicable to an electric supercharging apparatus and a multi-stage supercharging system using the electric supercharging apparatus, which is driven by an electric motor for supercharging an internal combustion engine such as an engine.

REFERENCE SIGNS LIST

1 Electric supercharging apparatus
2 Compressor
3 Electric motor
4 Inverter unit
5 Inlet port
6 Compressor wheel
7 Compressor cover
8 Motor housing
9 Stator
10 Rotor shaft (Rotator)
11 Motor coil
12 Rolling bearing
13 Gas supply port
14 Gas discharge port
15 Intake passage (First intake passage)
16 Negative pressure outlet port
17 First cooling passage
18 Second cooling passage
19 Control valve (First control valve)
20 Controller
21 Inverter housing
22 Element circuit board
23 Air hole
24 Opening hole
25 Cooling pin
26 Negative pressure pump
27 Second intake passage
28 Second control valve
100 Engine
110 Turbocharger
111 Exhaust turbine
112 Compressor
113 Waste gate valve
120 Bypass valve
121 Bypass passage
130 Intercooler

The invention claimed is:

1. An electric supercharging apparatus which is configured to rotate an electric motor that comprises a rotor shaft rotatably supported in a motor housing to which a motor coil and a stator are fixed, so as to drive and supercharge a compressor connected to one end of the rotor shaft, the electric supercharging apparatus comprising:
  a gas supply port and a gas discharge port which are provided in the motor housing;
    wherein the gas discharge port in the motor housing is connected to an intake passage, and wherein the gas supply port opens to another end side of the motor housing opposite to one end side at which the motor housing is connected to the compressor, a cooling passage which connects the gas supply port and the gas discharge port in the motor housing and which is formed in the stator along the motor coil in an outer periphery of the motor coil;

wherein outside air is introduced to the cooling passage from the gas supply port by a negative pressure of an inlet port of the compressor applied to the cooling passage via the intake passage; and an inverter unit comprising an element circuit board housed in an inverter housing, the inverter unit being mounted on a side of the motor housing where the gas supply port is formed.

2. The electric supercharging apparatus according to claim 1, wherein the cooling passage includes a plurality of cooling passages each of which connects the gas supply port and the gas discharge port, each of the plurality of cooling passages surrounds the motor coil in a section orthogonal to the rotor shaft.

3. The electric supercharging apparatus according to claim 1, wherein the cooling passage is configured in part to include an outer wall surface of the motor coil.

4. An electric supercharging apparatus which is configured to rotate an electric motor that comprises a rotor shaft rotatably supported in a motor housing to which a motor coil and a stator are fixed, so as to drive and supercharge a compressor connected to one end of the rotor shaft, the electric supercharging apparatus comprising:

a gas supply port and a gas discharge port which are provided in the motor housing;

wherein the gas discharge port in the motor housing is connected to an intake passage, and wherein the gas supply port opens to another end side of the motor housing opposite to one end side at which the motor housing is connected to the compressor;

a first cooling passage which connects the gas supply port and the gas discharge port in the motor housing and which is formed in the stator along the motor coil in an outer periphery of the motor coil; and a second cooling passage which connects the gas supply port to the gas discharge port in the motor housing and which is formed along the rotor shaft between the rotor shaft and the motor coil, wherein the second cooling passage joins the first cooling passage in the motor housing and outside air is introduced to the first cooling passage and the second cooling passage from the gas supply port by a negative pressure of an inlet port of the compressor applied to the first cooling passage via the intake passage.

5. The electric supercharging apparatus according to claim 4, wherein the first cooling passage includes a plurality of cooling passages each of which connects the gas supply port and the gas discharge port, each of the plurality of cooling passages surrounds the motor coil in a section orthogonal to the rotor shaft.

6. The electric supercharging apparatus according to claim 4, wherein the first cooling passage is configured in part to include an outer wall surface of the motor coil.

* * * * *